«12» United States Patent
Lin et al.

«10» Patent No.: US 10,630,898 B2
«45» Date of Patent: Apr. 21, 2020

«54» IMAGE CAPTURING APPARATUS, METHOD FOR ADJUSTING BRIGHTNESS OF IMAGES AND IMAGE PROCESSING APPARATUS

«71» Applicant: ABILITY ENTERPRISE CO., LTD., New Taipei (TW)

«72» Inventors: Shiu-Yung Lin, New Taipei (TW); Cheng-Chang Wu, New Taipei (TW)

«73» Assignee: ABILITY ENTERPRISE CO., LTD., New Taipei (TW)

«*» Notice: Subject to any disclaimer, the term of this patent is extended or adjusted under 35 U.S.C. 154(b) by 18 days.

«21» Appl. No.: 16/022,763

«22» Filed: Jun. 29, 2018

«65» Prior Publication Data

US 2019/0007606 A1 Jan. 3, 2019

Related U.S. Application Data

«60» Provisional application No. 62/526,438, filed on Jun. 29, 2017.

«51» Int. Cl.
H04N 5/232 (2006.01)
H04N 5/225 (2006.01)
G06T 1/00 (2006.01)
G06T 7/80 (2017.01)
H04N 5/235 (2006.01)
(Continued)

«52» U.S. Cl.
CPC ....... H04N 5/23229 (2013.01); G06T 1/0007 (2013.01); G06T 3/4038 (2013.01); G06T 7/80 (2017.01); H04N 5/2173 (2013.01); H04N 5/2254 (2013.01); H04N 5/2258 (2013.01); H04N 5/235 (2013.01); H04N 5/23238 (2013.01); H04N 9/045 (2013.01); G02B 13/06 (2013.01)

«58» Field of Classification Search
CPC ............. H04N 5/2258; H04N 5/23229; H04N 5/23238; H04N 5/2353; H04N 5/235; G06T 1/0007; G06T 7/80
See application file for complete search history.

«56» References Cited

U.S. PATENT DOCUMENTS 9,892,493 B2 * 2/2018 Pekkucuksen .......... G06T 5/006
2002/0122113 A1 * 9/2002 Foote .................... G06T 3/4038
348/48

(Continued)

Primary Examiner — Daniel M Pasiewicz
«74» Attorney, Agent, or Firm — McClure, Qualey & Rodack, LLP

«57» ABSTRACT

An image capturing apparatus includes a first lens module, a second lens module and an operation module which divides a first left block, a second right block of the first image and a second right block, a second left block of the second image into a plurality of first right sub-blocks, first left sub-blocks, second right sub-blocks and second left sub-blocks respectively, compares a first parameter, a second parameter and/or a third parameter of the first left sub-blocks, the first right sub-blocks, the second left sub-blocks and the second right sub-blocks, obtains a plurality of first difference values, a plurality of second difference values and/or a plurality of third difference values, obtains a total weighting value according to the first difference values, the second difference values and/or the third difference values, and adjusts brightness of the first image and the second image with the total weighting value.

20 Claims, 6 Drawing Sheets (51) Int. Cl.
*H04N 5/217* (2011.01)
*H04N 9/04* (2006.01)
*G06T 3/40* (2006.01)
*G02B 13/06* (2006.01)

(56) References Cited

U.S. PATENT DOCUMENTS

| | | | |
|---|---|---|---|
| 2007/0086645 A1* | 4/2007 | Kim | G06K 9/20 382/154 |
| 2012/0262607 A1* | 10/2012 | Shimura | H04N 5/2258 348/239 |
| 2015/0138312 A1* | 5/2015 | Liu | G06T 3/4038 348/36 |
| 2015/0288864 A1* | 10/2015 | Ollier | G06T 3/4038 348/38 |
| 2016/0125570 A1* | 5/2016 | Macmillan | G06T 3/0068 348/218.1 |
| 2017/0230587 A1* | 8/2017 | Kanai | H04N 5/265 |
| 2018/0268521 A1* | 9/2018 | Ding | G06T 3/4038 |
| 2019/0238887 A1* | 8/2019 | Aflaki Beni | H04N 5/23238 |

* cited by examiner

IMAGE CAPTURING APPARATUS, METHOD FOR ADJUSTING BRIGHTNESS OF IMAGES AND IMAGE PROCESSING APPARATUS

This application claims the benefit of U.S. provisional application Ser. No. 62/526,438, filed Jun. 29, 2017, the subject matter of which is incorporated herein by reference.

BACKGROUND OF THE INVENTION

Field of the Invention

The invention relates to an image capturing apparatus, a method for adjusting brightness of images and an image processing apparatus, especially relates to an image capturing apparatus, a method for adjusting brightness of images and an image processing apparatus which can integrate/stitch multiple frames of image.

Description of the Related Art

In 1839, the first camera in human history was invented. Since then, people have captured beautiful sceneries and recorded life through cameras. Today, photography has become an important part of modern life. With the development of science and technology, the cooperation of cameras and image processing techniques can take photos with a broader view.

In techniques of image processing, image stitching technique refers to produce an image with wider view by integrating at least two material images. However, when there exists a difference in brightness (or luminance) between the two material images, the produced image with wider view may show a discontinue feel, and result in poor effect of image processing.

In view of above, how to provide an image apparatus and a method for adjusting brightness of images is one of subjects of the industry.

SUMMARY OF THE INVENTION

To achieve the above purpose, an embodiment of the present invention discloses an image capturing apparatus, comprising a first lens module, a second lens module and an operation module. The first lens module is set toward a first direction, and provides a first image at least having a first left block and a first right block. The second lens module is set toward a second direction, and provides a second image at least having a second left block and a second right block. The operation module is electrically coupled to the first lens module and the second lens module, and respectively divides the first left block, the first right block, the second left block and the second right block into a plurality of first left sub-blocks, a plurality of first right sub-blocks, a plurality of second left sub-blocks, and a plurality of second right sub-blocks; compares at least one of a first parameter, a second parameter and a third parameter of at least one pair of the first left sub-blocks and the second right sub-blocks, compares the first parameter, the second parameter and/or the third parameter of a corresponding pair of the first right sub-blocks and the second left sub-blocks, and obtains at least one corresponding first difference value, at least one corresponding second difference value and at least one corresponding third difference value; and obtains a total weighting value in accordance with the first difference values, the second difference values and/or the third difference values, and adjusts brightness of the first image and/or the second image with the total weighting value.

To achieve the above purpose, an embodiment of the present invention discloses a method for adjusting brightness of images, adapted to an image processing apparatus comprising an operation module. The method comprising: providing a first image and a second image to the operation module, the first image having a first left block and a first right block, and the second image having a second left block and a second right block; and adopting the operation module respectively dividing the first left block, the first right block, the second left block and the second right block into a plurality of first left sub-blocks, a plurality of first right sub-blocks, a plurality of second left sub-blocks, a plurality of second right sub-blocks; comparing a first parameter, a second parameter and/or a third parameter of at least one pair of the first left sub-blocks and the second right sub-blocks, comparing the first parameter, the second parameter and/or the third parameter of a corresponding pair of the first right sub-blocks and the second left sub-blocks, and obtaining at least one corresponding first difference value, at least one corresponding second difference value and/or at least one corresponding third difference value; obtaining a total weighting value in accordance with the first difference values, the second difference values and the third difference values; and, adjusting brightness of the first image and/or the second image with the total weighting value.

To achieve the above purpose, an embodiment of the present invention discloses an image processing apparatus, comprising a storage module and an operation module. The storage module stores at least one first image and at least one second image. The first image at least includes a first left block and a first right block, and the second image at least includes a second left block and a second right block. The operation module respectively divides the first left block, the first right block, the second left block and the second right block into a plurality of first left sub-blocks, a plurality of first right sub-blocks, a plurality of second left sub-blocks, and a plurality of second right sub-blocks; compares at least one of a first parameter, a second parameter and a third parameter of at least one pair of the first left sub-blocks and the second right sub-blocks, compares the first parameter, the second parameter and/or the third parameter of a corresponding pair of the first right sub-blocks and the second left sub-blocks, and obtains at least one corresponding first difference value, at least one corresponding second difference value and at least one corresponding third difference value; and obtains a total weighting value in accordance with the first difference values, the second difference values and/or the third difference values, and adjusts brightness of the first image and/or the second image with the total weighting value.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
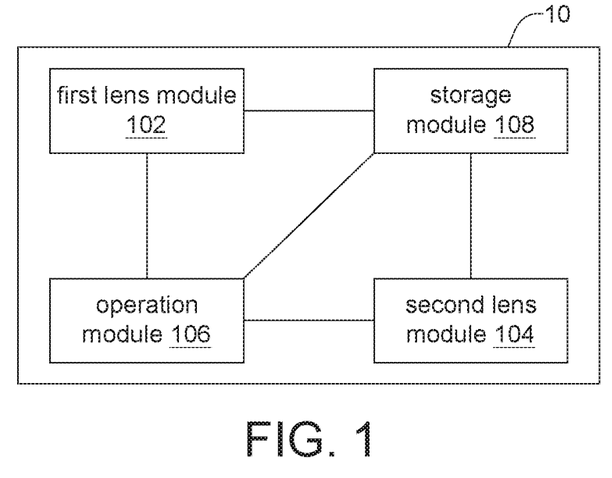
FIG. 1 shows a system block diagram of an image capturing apparatus according to an embodiment of the present invention.

FIG. 1 shows a system block diagram of an image capturing apparatus according to an embodiment of the present invention. As shown in FIG. 1, the image capturing apparatus 10 at least includes a first lens module 102, a second lens module 104, an operation module 106 and a storage module 108. The image capturing apparatus 10 may be, but not limited to, a digital device, a mobile device with multi-lens, a communication device with multi-lens, a panoramic image capturing device, an action camera, a vehicle image capturing device or an aerial photographing device.

Figure 2:
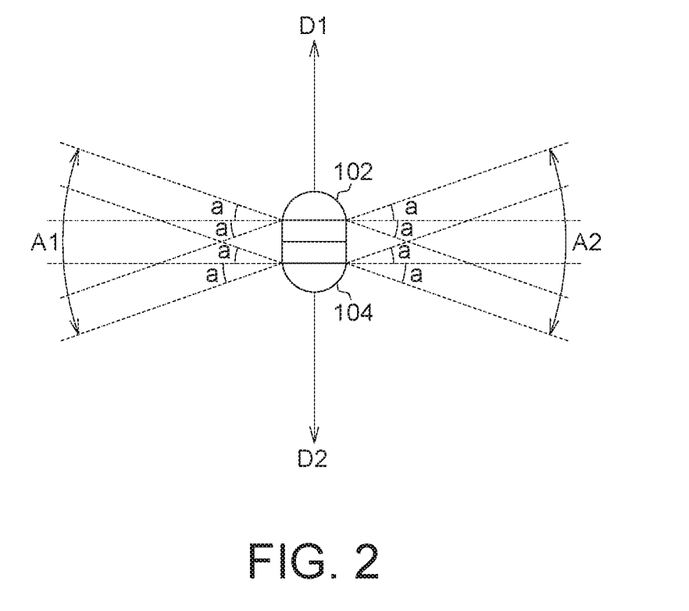
FIG. 2 shows a scheme diagram of an embodiment of field of view of a first lens module and a second lens module of the image capturing apparatus shown in FIG. 1.

FIG. 2 shows a scheme diagram of an embodiment of field of view (FOV) of a first lens module 102 and a second lens module 104 of the image capturing apparatus shown in FIG. 1. As shown in FIG. 2, the first lens module 102 captures a first image toward a first direction D1, and the second lens module 104 captures a second image toward a second direction D2. The first direction D1 may be different from the second direction D2. That is, the included angle between the first direction D1 and the second direction D2 is θ°, where 0<θ≤180. A horizontal dotted line in the left side of the first direction D1 is defined as 0 degree, and a horizontal dotted line in the right side of the first direction D1 is defined as 180-degree, herein.

In an embodiment, the included angel between the first direction D1 and the second direction D2 may substantially be, or approximate to, but not limited to, 180 degrees (i.e., θ°≈180 degrees). The FOV of the first lens module 102 and the second lens module 104 may greater than 180 degrees. For example, the FOV of the first lens module 102 and the second lens module 104 are both (180+2a) degrees, where "a" is a real number greater than 0. In an embodiment, "a" is 4.24 substantially. In the embodiment, the first lens module 102 provides a first image IMG1, and the second lens module 104 provides a second image IMG2.

The operation module 106 is electrically coupled to the first lens module 102, the second lens module 104 and the storage module 108. The operation module 106 may perform operation on the first image IMG1 and the second IMG2. Further, the operation module 106 may adjust an image capturing parameter of the first lens module 102 and/or the second lens module 104, and/or adjust a luminance value of the obtained first image IMG1 and/or the obtained second image IMG2. In a specific embodiment, the operation module 106 integrates the adjusted first image IMG1 and the adjusted second image IMG2 to produce a third image IMG3; in another specific embodiment, the operation module 106 integrates the first image IMG1 and the second image IMG2 to produce the third image IMG3, and then adjusts a luminance parameter of the original first image IMG1 and/or the original second image IMG2, wherein the operation module 106 may produce the third image IMG3 by stitching the first image IMG1 and the second image IMG2. However, the present invention is not limited thereby.

The storage module 108 is electrically coupled to the first lens module 102, the second lens module 104 and the operation module 106. The first image IMG1, the second image IMG2, the third image IMG3, configuration data and electrical parameters of the image capturing apparatus 10 may be stored in the storage module 108, but the present invention is not limited by. In another embodiment, at least one of the first image IMG1, the second image IMG2 and the third image IMG3 may be stored in a RAM (not shown); in yet another embodiment, the storage module 108 includes at least one memory (not shown).

Figure 3:
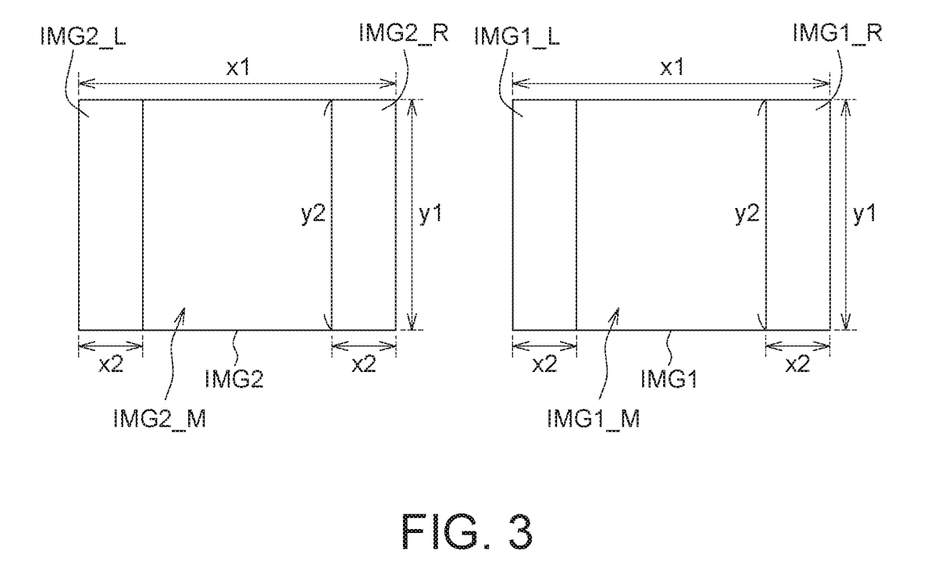
FIG. 3 shows a scheme diagram of a first image and a second image.

FIG. 3 is a scheme diagram of the first image IMG1 and the second image IMG2. Referring to FIG. 2 and FIG. 3 simultaneously, if the first lens module 102 and the second lens module 104 capture images in opposite directions, and θ°≈180 degrees, overlapping regions of the first image IMG1 and the second image IMG2 may be processed to obtain the third image IMG3.

In addition, the first image IMG1 includes a first main block IMG1_M, a first left block IMG1_L and a first right block IMG1_R. The first left block IMG1_L is corresponding to scenery image of FOV between (0–a) degrees and (0+a) degrees captured by the first lens module 102 toward the first direction D1; the first right block IMG1_R is corresponding to scenery image of FOV between (180–a) degrees and (180+a) degrees captured by the first lens module 102 toward the first direction D1; and the first main block IMG1_M is corresponding to scenery image of FOV between (0+a) degrees and (180–a) degrees captured by the first lens module 102 toward the first direction D1.

Similarly, the second image IMG2 includes a second main block IMG2_M, a second left block IMG2_L and a second right block IMG2_R. The second left block IMG2_L is corresponding to scenery image of FOV between (180–a) degrees and (180+a) degrees captured by the second lens module 104 toward the second direction D2; the second right block IMG2_R is corresponding to scenery image of FOV between (0+a) degrees and (0–a) degrees captured by the second lens module 104 toward the second direction D2; and the second main block IMG2_L is corresponding to scenery image of FOV between (0+a) degrees and (180–a) degrees captured by the second lens module 104 toward the second direction D2.

As shown in FIG. 3, in an embodiment, the first lens module 102 and the second lens module 104 have the same FOV in breadth, and the first lens module 102 and the second lens module 104 output the first image IMG1 and the second image IMG2 of the same size respectively. That is, the first image IMG1 and the second image IMG2 both have a width of x1 and a height of y1. Furthermore, in a specific embodiment, the first left block IMG1_L, the first right block IMG1_R, the second left block IMG2_L and the second right block IMG2_R may have the same size. That is, the first left block IMG1_L, the first right block IMG1_R, the second left block IMG2_L and the second right block IMG2_R may have a width of x2 and a height of y2, wherein in the embodiment y2=y1 is taken as an example for illustration, but the present invention is not limited by. In other words, in other embodiments, y2 may be smaller than y1. Based on the first lens module 102 and the second lens module 104 both have FOV of (180+2a) degrees and capture images in opposite directions simultaneously, the first left block IMG1_L and the second right block IMG2_R include a part of scenery image in a first FOV A1, and the first right block IMG1_R and the second left block IMG2_L include a part of scenery image in a second FOV A2. Furthermore, if a thickness between the first lens module 102 and the second lens module 104 becomes smaller and almost can be ignored, the first left block IMG1_L and the second right block IMG2_R show substantially similar image, and the first right block IMG1_R and the second left block IMG2_L show substantially similar image.

Referring to FIG. 1, FIG. 2 and FIG. 3 simultaneously, in an embodiment, the included between the first direction D1 and the second direction D2 may substantially be 180 degrees. That is, the first lens module 102 and the second lens module 104 capture the first image IMG1 and the second image IMG2 in opposite directions, and the operation module 106 performs operation on the first image IMG1 and the second image IMG2, adjusts the brightness difference between the first image IMG1 and the second image IMG2 according to the result of the operation, and further integrates the first image IMG1 and the second image IMG2 to produce the third image IMG3. Thereby, the brightness difference between the first image IMG1 and the second image IMG2 can be reduced, and the overall brightness of the integrated third image IMG3 can also become more harmonious and unobtrusive. In addition, the third image IMG3 may also be displayed on a display module (not shown) or stored in the storage module 108. In an embodiment, the third image IMG3 is a panoramic image, for example, a 360-degree panoramic image, but the present invention is not limited by. In another embodiment, the third image IMG3 may be a wide image obtained by image operation and processing multiple frames of images captured with different shot angles. In such an embodiment, the included angle between the first direction D1 and the second direction D2 may greater than 0 and smaller than 180 degrees (0 degree<θ°<180 degrees).

Figure 4A:
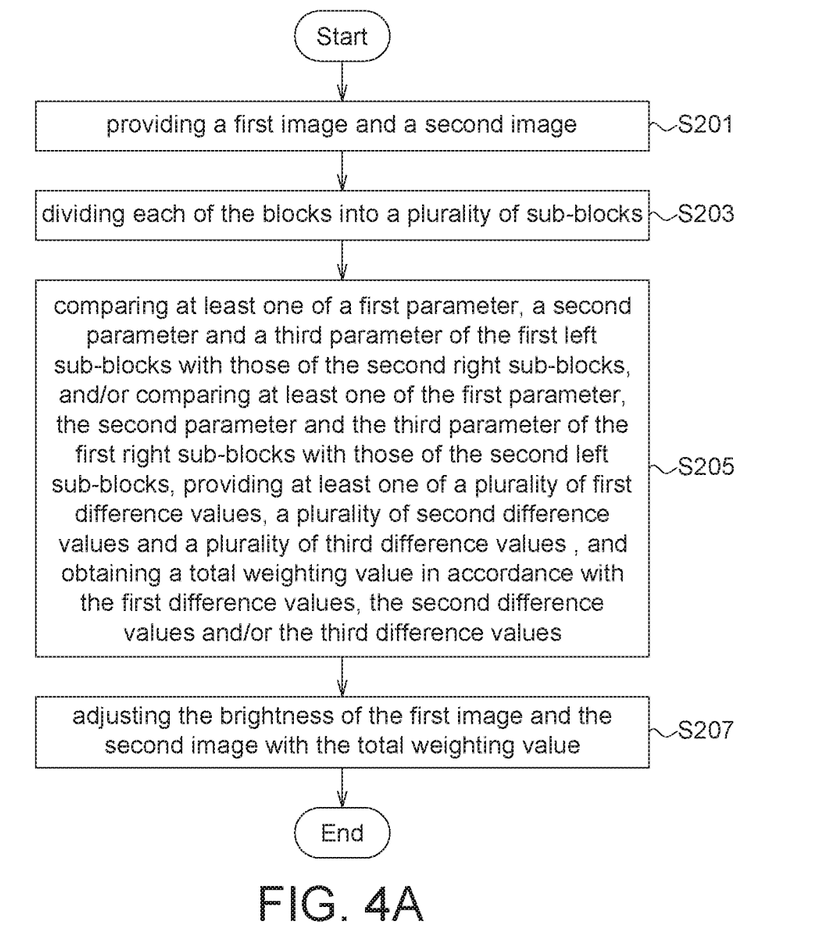
FIGS. 4A and 4B show flowcharts of a method for adjusting brightness of images according to an embodiment of the present invention.
Figure 4B:
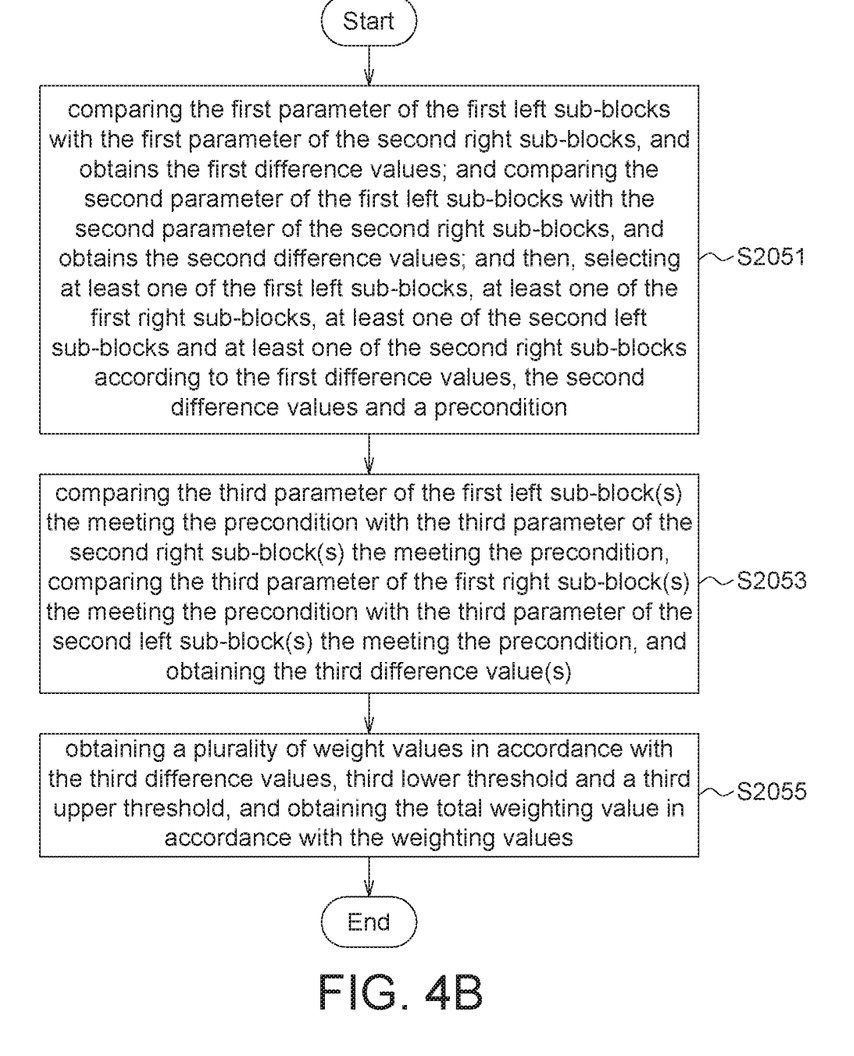
Figure 5:
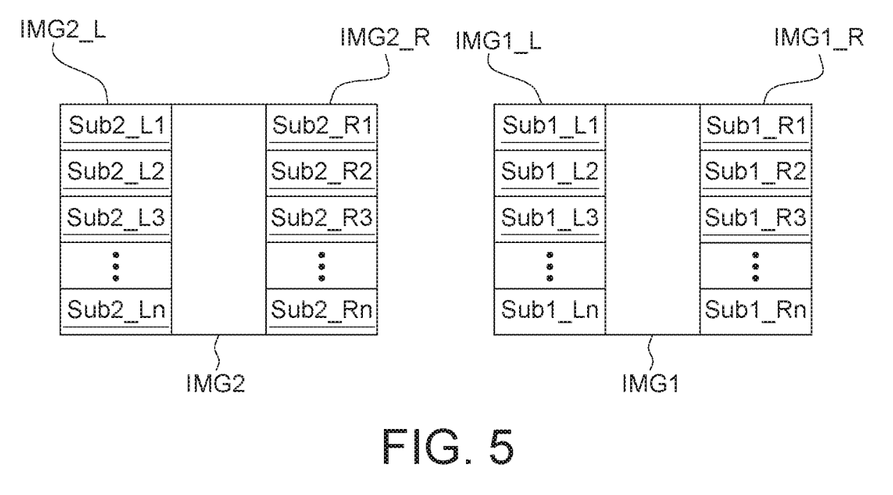
FIGS. 5-7 show operation scheme diagrams of a method for adjusting brightness of images according to an embodiment of the present invention.
Figure 6:
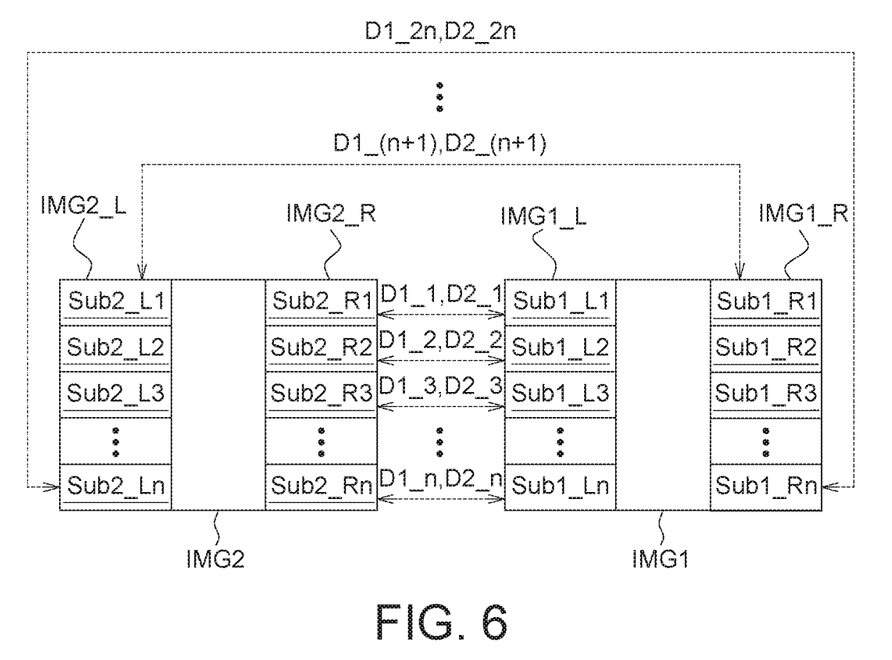
Figure 7:
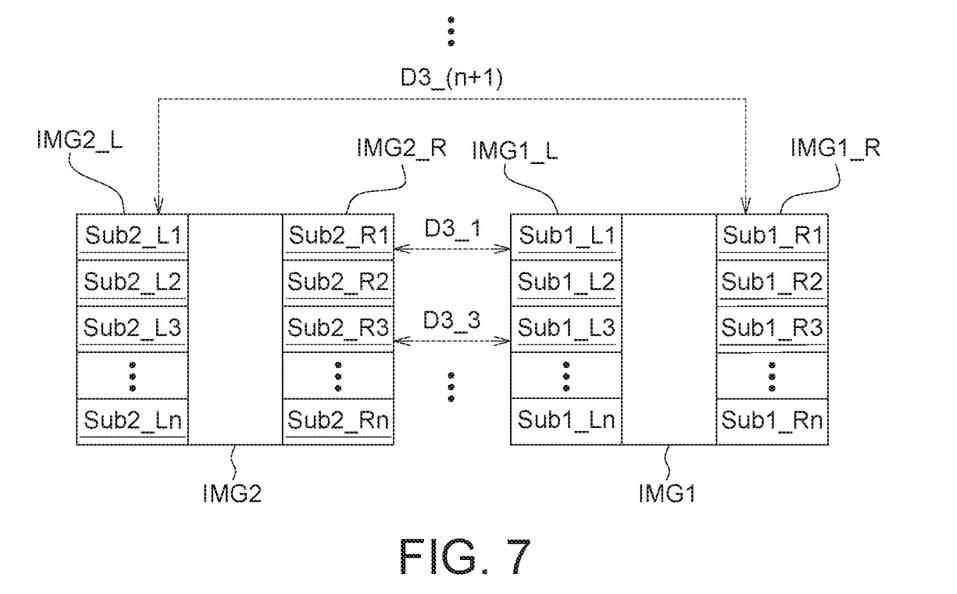
Figure 8:
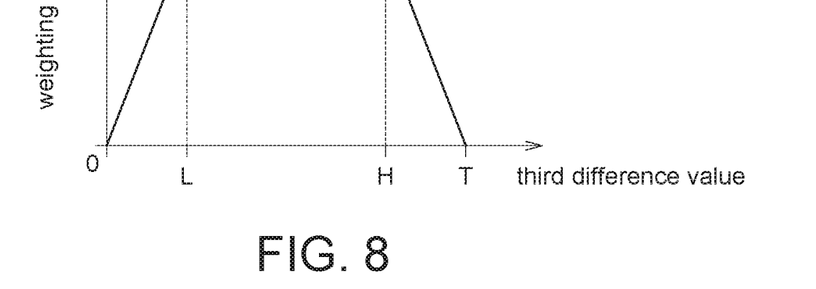
FIG. 8 shows a relationship diagram between a weighting value and a total weighting value according to an embodiment of the present invention.

FIGS. 4A and 4B show flowcharts of a method for adjusting brightness of images according to an embodiment of the present invention; FIGS. 5-7 show operation scheme diagrams of a method for adjusting brightness of images according to an embodiment of the present invention; and FIG. 8 shows a relationship diagram between a weighting value and a total weighting value according to an embodiment of the present invention.

In an embodiment, the method for adjusting brightness of images may be adapted to an image processing apparatus which includes the operation module 106; in another embodiment, the image processing apparatus may be the image capturing apparatus 10 which includes the first lens module 102 and the second lens module 104, but the present invention is not limited by. The image processing apparatus includes but is not limited to a handheld electronic device, a remote control/receiver device, a personal computer, a network server, and the like; the operation module 106 includes but is not limited to a central processing unit (CPU) and an application-specific integrated circuit (ASIC), System on Chip (SoC), etc. The following description is illustrated with referring to FIG. 1 and FIG. 3 to FIG. 8 for ease of understanding.

In step S201, providing the first image IMG1 and the second image IMG2 to the operation module 106 is performed. In an embodiment, the first image IMG1 and the second image IMG2 may be captured by the first lens module 102 and the second lens module 104 respectively. In another embodiment, the first image IMG1 and the second image IMG2 is pre-stored in the storage module 108, and the operation module 106 may obtain the first image IMG1 and the second image IMG2 from the storage module 108. When the image capturing apparatus 10 is in a statistic video mode, the first lens module 102 and the second lens module 104 may provide a frame of the first image IMG1 and a frame of the second image IMG2; when the image capturing apparatus 10 is in a preview mode, the first lens module 102 may provide an image stream of multiple frames of the first images IMG1, and the second lens module 104 may provide an image stream of multiple frames of the second images IMG2. The embodiment takes the statistic video mode for illustrating, but the invention is not limited by.

In step S203, as shown in FIG. 5, each of the blocks are divided into a plurality of sub-blocks by the operation module 106. In an embodiment, the operation module 106 divides the first left block IMG1_L, the first right block IMG1_R, the second left block IMG2_L and the second right block IMG2_R into n1 first left sub-block Sub1_L1-Sub1_Ln1, n2 first right sub-block Sub1_R-Sub1_Rn2, n2 second left sub-block Sub2_L1-Sub2_Ln2 and n1 second right sub-block Sub2_R-Sub2_Rn2 respectively, wherein n1 and n2 are integers greater than 0, and n1 may be greater than, smaller than or equals to n2.

In following description, n1=n2=n is taken as an example. In step S205, by the operation module 106, comparing at least one of a first parameter, a second parameter and a third parameter of the first left sub-blocks Sub1_L1-Sub1_Ln with those of the second right sub-blocks Sub2_R1-Sub2_Rn, and/or comparing at least one of the first parameter, the second parameter and the third parameter of the first right sub-blocks Sub1_R1-Sub1_Rn with those of the second left sub-blocks Sub2_L1-Sub2_Ln, providing at least one of a plurality of first difference values, a plurality of second difference values and a plurality of third difference values, and obtaining a total weighting value according to the first difference values, the second difference values and/or the third difference values.

In an embodiment, the operation module 106 compares all the first left sub-blocks Sub1_L1-Sub1_Ln with all the second right sub-blocks Sub2_R1-Sub2_Rn. In another embodiment, the operation module 106 compares 2i of the first left sub-blocks Sub1_L1-Sub1_Li, Sub1_L(n−i)-Sub1_Ln at two sides area with 2i of the second right sub-blocks Sub2_R1-Sub2_Ri, Sub2_R(n−i)-Sub2_Rn at two sides area. In yet another embodiment, the operation module 106 compares j1-j2 of the first left sub-blocks Sub1_Lj1-Sub1_Lj2 at middle area with j1-j2 of the second right sub-blocks Sub2_Rj1-Sub2_Rj2 at middle area. Herein, I, j1 and j2 are independent integers greater than 0, but the present invention is not limited by.

In detail, step S205 includes steps S2051-S2055.

In step S2051, the operation module 106 compares the first parameter of the first left sub-blocks Sub1_L1-Sub1_Ln with the first parameter of the second right sub-blocks Sub2_R1-Sub2_Rn, and obtains the first difference values; and compares the second parameter of the first left sub-blocks Sub1_L1-Sub1_Ln with the second parameter of the second right sub-blocks Sub2_R1-Sub2_Rn, and obtains the second difference values. Then, at least one of the first left sub-blocks Sub1_L1-Sub1_Ln, at least one of the first right sub-blocks Sub1_R1-Sub1_Rn, at least one of the second left sub-blocks Sub2_L1-Sub2_Ln and at least one of the second right sub-blocks Sub2_R1-Sub2_Rn are selected according to the first difference values, the second difference values and a precondition.

In an embodiment, as shown in FIG. 6, the operation module 106 compares the first parameter of the first left sub-block Sub1_Lx with the first parameter of the second right sub-block Sub2_Rx to obtain the first difference value D1_x, compares the second parameter of the first left sub-block Sub1_Lx with the second parameter of the second right sub-block Sub2_Rx to obtain the second difference value D2_x, wherein x is a positive integer which is small than or equals to n;

In a specific embodiment, the precondition is that the first difference value falls within a first range and the second difference vails falls within a second range. That is, if the first difference value D1_1 fails in the first range and the second difference D2_1 fails in the second range, the first left sub-block Sub1_L1 and the second right sub-block Sub2_R1 meet the precondition and step S2053 may be performed on the two sub-blocks; otherwise, the first difference value D1_1 fails in the first range and the second difference D2_1 does not fail in the second range, or if the first difference value D1_1 does not fail in the first range and the second difference D2_1 fails in the second range, step S2053 may be performed on the two sub-blocks, and so forth.

It should be noted that, in different embodiment, the precondition may be that the first difference value falls within a first range or the second difference vails falls within a second range, and the present invention is not limited thereto.

In a specific embodiment, a color format of the first image IMG1 and the second image IMG2 may be RGB format. The first parameter may be a green value divided by a red value (G/R) or a ratio of the green value to the red value, and the second parameter may be the green value divided by a blue value (G/B) or a ratio of the green value to the blue value; the first difference value D1_x may be a difference value between the first parameter (G/R) of the first left sub-block Sub1_Lx and the first parameter (G/R) of the second right sub-block Sub2_Rx, and/or the second difference value D2_y may be a difference value between the second parameter (G/B) of the first left sub-block Sub1_Ly and the second parameter (G/B) of the second right sub-block Sub2_Ry; the first range may be a range which is greater than a first lower threshold and smaller than a first upper threshold, and the second range may be a range which is greater than a second lower threshold and smaller than a second upper threshold, wherein the first lower threshold and the second lower threshold may be either the same or different, the first upper threshold and the second upper threshold may be either the same or different, and the present invention is not limited by.

In step S2053, the operation module 106 may compare the third parameter of the first left sub-block(s) the meeting the present condition with the third parameter of the second right sub-block(s) the meeting the present condition, compare the third parameter of the first right sub-block(s) the meeting the present condition with the third parameter of the second left sub-block(s) the meeting the present condition, and obtain the third difference value(s).

As shown in FIG. 7, if the first left sub-block Sub1_L1 and the second right sub-block Sub2_R1 meet the present condition in step S2051, the operation module 106 may further compare the third parameter of the first left sub-block Sub1_L1 with the third parameter of the second right sub-block Sub2_R1 to obtain the third difference value; if the first left sub-block Sub1_L1 and the second right sub-block Sub2_R1 meet the present condition in step S2051, the operation module 106 may further compare the third parameter of the first left sub-block Sub1_L1 with the third parameter of the second right sub-block Sub2_R1 to obtain the third difference value D3_1; if the first right sub-block Sub1_R1 and the second left sub-block Sub2_L1 meet the present condition in step S2051, the operation module 106 may further compare the third parameter of the first right sub-block Sub1_R1 with the third parameter of the second left sub-block Sub2_L1 to obtain the third difference value D3_(1+n), wherein the third parameter may be the luminance value.

In step S2055, the operation module 106 obtains a plurality of weighting values according to the third difference values, third lower threshold and a third upper threshold, and obtains the total weighting value according to the weighting values. As shown in FIG. 8, when the third difference value is between 0 and the third lower threshold L, the weighting value increases from 0 to a maximum value M; when the third difference value is between the third lower threshold L and the third upper threshold H, the weighting value is the maximum value M; and when the third difference value is between the third higher threshold H and a difference limit value T, the weighting value is decremented from the maximum value M to 0. However the present invention is not limited thereby. And then, all the weighting values are summed, and the total weighting value is obtained.

Specifically, step S2051 is performed to preliminary assess the first left sub-block Sub1_Lx and the second right sub-block Sub1_Rx, as well as the first right sub-block Sub1_Rx and the second left sub-block Sub1_Lx, and so forth. If the precondition is not met, it is determined that the difference between the two corresponding sub-blocks is too large or too small, and no further assessment is needed. Step S2053 is performed to further assess the difference between the two corresponding sub-blocks which meet the precondition, and the brightness difference between the first image IMG1 and the second image IMG2 can be known by the total weighting value.

In step S207, the operation module 106 adjust the brightness of the first image IMG1 and the second image IMG2 with the total weighting value, to reduce the brightness difference between the first image IMG1 and the second image IMG2. In the embodiment, an approach for adjusting may be adjusting an image capturing parameter, including but not limited to a brightness sensing parameter, of at least one of the first lens module 102 and the second lens module 104 according to the total weighting value. Herein, the brightness sensing parameter may be aperture, shutter time and/or ISO, etc. For example, if the overall brightness of the first image IMG1 is higher than the second image IMG2, shown by the total weighting value, the operation module 106 may increase the ISO of the second lens module 104 according to the total weighting value, or decrease the ISO of the first lens module 102 according to the total weighting value, and/or increase the ISO of the second lens module 104 as well as decrease the ISO of the first lens module 102 according to the total weighting value. In addition, another approach for adjusting may be the luminance value of at least one of the first image and the second image IMG2. In another embodiment, increasing/decreasing the luminance by a step value (e.g., 0.1) is employed to adjust the brightness parameter or the luminance value, thereby the stability of the first image stream of the first images IMG1 and the second image stream of the second images IMG2 can be maintained.

In another embodiment, when the color format of the first image IMG1 and the second image IMG2 is YUV format, the color format of the first image IMG1 and the second image IMG2 may be converted initially from YUV format to RGB format. In addition, if the color format is not converted, an U value of YUV value may be set as the first parameter, and a V value may be set as the second parameter.

In a specific embodiment, the FOV the first lens module 102 and the second lens module 104 may be 188.48 degrees (that is, a is 4.24). The first image IMG1 and the second image IMG2 have the width x1 of 3200 pixels and the height y1 of 3056 pixels, and n is 32. However, the present invention is not limited thereby.

Furthermore, in a different embodiment, at least one of the first difference value and the second difference value may be a ratio or the first parameter to the second parameter. The relationship between the third difference value and the weighting value may be parabolic relationship, linear relationship, or the weighting value is a function of the third difference value, and the present invention is not limited thereto.

According to the embodiments of the image capturing apparatus and the method for adjusting the brightness of images, the brightness difference between the first image IMG provided by the first lens module 102 and the second image IMG2 provided by the second lens module 104 may be known by calculating the total weighting value, and the brightness difference between the first image IMG1 and the second image IMG2 may be reduced immediately by adjusting the brightness parameter of at least one of the first lens module 102 and the second lens module 104 according to the total weighting value, or by adjusting the luminance value of at least one of the first image IMG1 and the second IMG2 according to the total weighting value. Thereby, the third image IMG3 with a better quality may be obtained.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing apparatus, comprising:
a first lens module, setting toward a first direction and providing a first image at least having a first left block and a first right block;
a second lens module, setting toward a second direction and providing a second image at least having a second left block and a second right block; and
an operation module, electrically coupled to the first lens module and the second lens module, and respectively dividing the first left block, the first right block, the second left block and the second right block into a plurality of first left sub-blocks, a plurality of first right sub-blocks, a plurality of second left sub-blocks, and a plurality of second right sub-blocks; comparing at least one of a first parameter, a second parameter and a third parameter of at least one pair of the first left sub-blocks and the second right sub-blocks, comparing the first parameter, the second parameter and/or the third parameter of a corresponding pair of the first right sub-blocks and the second left sub-blocks, and obtaining at least one corresponding first difference value, at least one corresponding second difference value and at least one corresponding third difference value; and, obtaining a total weighting value in accordance with the first difference values, the second difference values and/or the third difference values, and adjusting brightness of the first image and/or the second image with the total weighting value.

2. The image capturing apparatus according to claim 1, wherein the operation module compares the first parameters of the plurality pair of the first left sub-blocks and the second right sub-blocks, compares the first parameters of the corresponding first right sub-blocks and the corresponding second left sub-blocks, and obtains the first difference values; and, compares the second parameters of the plurality pair of the first left sub-blocks and the second right sub-blocks, compares the second parameters of the corresponding first right sub-blocks and the corresponding second left sub-blocks, and obtains the second difference values.

3. The image capturing apparatus according to claim 2, wherein the operation module further selects some of the first left sub-blocks, some of the first right sub-blocks, some of the second left sub-blocks and some of the second right sub-blocks in accordance with the first difference values, the second difference values and a precondition.

4. The image capturing apparatus according to claim 3, wherein the operation module compares the third parameter of at least one pair of the selected first left sub-block and the selected second right sub-block, and compares the third parameter of the corresponding selected first right sub-block and the corresponding selected second left sub-block, and obtains the third difference value.

5. The image capturing apparatus according to claim 4, wherein the operation module further obtains at least one weighting value in accordance with the third difference value, a third lower threshold and a third upper threshold, and obtains the total weighting value with the at least one weighting value.

6. The image capturing apparatus according to claim 1, wherein the first parameter is a green value divided by a red value, a ratio of the green value to the red value or an U value for YUV format; and/or, the second parameter is the green value divided by a blue value, a ratio of the green value to the blue value or a V value of YUV format; and/or, the third parameter is a luminance value.

7. The image capturing apparatus according to claim 1, wherein the operation module adjusts a brightness parameter of the first lens module and/or the second lens module, and/or the operation module adjusts a luminance value of the first image and/or the second image.

8. The image capturing apparatus according to claim 1, wherein an included angle between the first direction and the second direction is θ°, and 0°<θ°≤180°.

9. A method for adjusting brightness of images, adapted to an image processing apparatus comprising an operation module, the method comprising:
providing a first image from a first lens module and a second image from a second lens module to the operation module, the first image having a first left block and a first right block, and the second image having a second left block and a second right block; and
adopting the operation module respectively dividing the first left block, the first right block, the second left block and the second right block into a plurality of first left sub-blocks, a plurality of first right sub-blocks, a plurality of second left sub-blocks, a plurality of second right sub-blocks; comparing a first parameter, a second parameter and/or a third parameter of at least one pair of the first left sub-blocks and the second right sub-blocks, comparing the first parameter, the second parameter and/or the third parameter of a corresponding pair of the first right sub-blocks and the second left sub-blocks, and obtaining at least one corresponding first difference value, at least one corresponding second difference value and/or at least one corresponding third difference value; obtaining a total weighting value in accordance with the first difference values, the second difference values and the third difference values; and, adjusting brightness of the first image and/or the second image with the total weighting value.

10. The method according to claim 9, wherein the operation module compares the first parameter of the plurality pair of the first left sub-blocks and the second right sub-blocks, compares the first parameter of the corresponding pairs of the first right sub-blocks and the second left sub-blocks, and obtains the first difference values; and/or compares the second parameter of the plurality pair of the first left sub-blocks and the second right sub-blocks, compares the second parameter of the corresponding pairs of the first right sub-blocks and the second left sub-blocks, and obtains the second difference values.

11. The method according to claim 10, wherein the operation module further selects some of the first left sub-blocks, some of the first right sub-blocks, some of the second left sub-blocks and some of the second right sub-blocks in accordance with the first difference values, the second difference values and a precondition.

12. The method according to claim 11, further comprising: comparing the third parameter of at least one pair of the select first left sub-block and the selected second right sub-block, and comparing the third parameter of the selected first right sub-blocks with the selected second left sub-block corresponding to the at least one pair, and obtaining the third difference value.

13. The method according to claim 12, further comprising: obtaining at least one weighting value and the total weighting value in accordance with the third difference value, a third lower threshold and a third upper threshold.

14. The method according to claim 9, wherein the first parameter is a green value divided by a red value, a ratio of the green value to the red value or an U value for YUV format; and/or, the second parameter is the green value divided by a blue value, a ratio of the green value to the blue value, or a V value of YUV format; and/or, the third parameter is a luminance value.

15. An image processing apparatus, comprising:
a storage module, storing at least one first image and at least one second image, the first image at least having a first left block and a first right block, and the second image at least having a second left block and a second right block; and
an operation module, respectively dividing the first left block, the first right block, the second left block and the second right block into a plurality of first left sub-blocks, a plurality of first right sub-blocks, a plurality of second left sub-blocks and a plurality of second right sub-blocks; comparing a first parameter, a second parameter and a third parameter of at least one pair of the first left sub-blocks and the second right sub-blocks, comparing the first parameter, the second parameter and/or the third parameter of a corresponding pair of the first right sub-blocks and the second left sub-blocks, and obtaining at least one corresponding first difference value, at least one corresponding second difference value and at least one corresponding third difference value; and, obtaining a total weighting value in accordance with the first difference values, the second difference values and the third difference values, and adjusting brightness of the first image and/or the second image with the total weighting value.

16. The image processing apparatus according to claim 15, wherein the operation module compares the first parameter of the plurality pair of the first left sub-blocks and the second right sub-blocks, compares the first parameter of the corresponding pairs of the first right sub-blocks and the second left sub-blocks, and obtaining the first difference values; and, compares the second parameter of the plurality pair of the first left sub-blocks and the second right sub-blocks, compares the second parameter of the corresponding pairs of the first right sub-blocks and the second left sub-blocks, and obtaining the second difference values.

17. The image processing apparatus according to claim 16, wherein the operation module further selects some of the first left sub-blocks, some of the first right sub-blocks, some of the second left sub-blocks and some of the second right sub-blocks in accordance with the first difference values, the second difference values and a precondition.

18. The image processing apparatus according to claim 17, wherein the operation module compares the third parameter of at least one pair of the select first left sub-block and the selected second right sub-block, and compares the third parameter of the selected first right sub-blocks with the selected second left sub-block corresponding to the at least one pair, and obtains the third difference value.

19. The image processing apparatus according to claim 18, wherein the operation module further obtains at least one weighting value in accordance with the third difference value, a third lower threshold and a third upper threshold, and obtains the total weighting value with the at least one weighting value.

20. The image processing apparatus according to claim 15, wherein the first parameter is a green value divided by a red value, a ratio of the green value to the red value or an U value for YUV format; and/or, the second parameter is the green value divided by a blue value, a ratio of the green value to the blue value or a V value of YUV format; and/or, the third parameter is a luminance value.

* * * * *